United States Patent
Yun et al.

(10) Patent No.: US 10,214,204 B2
(45) Date of Patent: Feb. 26, 2019

(54) DEVICE AND METHOD FOR CONTROLLING AN ENGINE CLUTCH IN AN ENVIRONMENTALLY-FRIENDLY VEHICLE

(71) Applicants: HYUNDAI MOTOR COMPANY, Seoul (KR); Kia Motors Corporation, Seoul (KR)

(72) Inventors: Seok Young Yun, Yongin-si (KR); Song Il Park, Seoul (KR); Seongwook Moon, Seoul (KR); Seok Min Jeong, Suwon-si (KR); Joonyoung Park, Seoul (KR); Ji Hoon Kang, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 90 days.

(21) Appl. No.: 15/374,568

(22) Filed: Dec. 9, 2016

(65) Prior Publication Data

US 2018/0111605 A1  Apr. 26, 2018

(30) Foreign Application Priority Data

Oct. 21, 2016  (KR) .................. 10-2016-0137782

(51) Int. Cl.
*B60W 20/50* (2016.01)
*B60W 10/02* (2006.01)
(Continued)

(52) U.S. Cl.
CPC ............ *B60W 20/50* (2013.01); *B60W 10/02* (2013.01); *B60W 10/06* (2013.01); *B60W 10/08* (2013.01); *B60W 10/11* (2013.01); *B60W 10/26* (2013.01); *B60W 50/14* (2013.01); *B60W 2510/0291* (2013.01); *B60W 2510/1005* (2013.01);
(Continued)

(58) Field of Classification Search
None
See application file for complete search history.

(56) References Cited

U.S. PATENT DOCUMENTS

2013/0138282 A1* 5/2013 Shin .................. B60L 11/12
701/22
2014/0011632 A1* 1/2014 Ito .................... B60W 10/11
477/5

(Continued)

FOREIGN PATENT DOCUMENTS

| JP | 2005-282600 A | 10/2005 |
| JP | 2011-230706 A | 11/2011 |
| JP | 5610158 B2 | 10/2014 |
| KR | 10-0897097 B1 | 5/2009 |
| KR | 10-2013-0051702 A | 5/2013 |

(Continued)

*Primary Examiner* — Timothy Hannon
(74) *Attorney, Agent, or Firm* — McDonnell Boehnen Hulbert & Berghoff LLP (57) ABSTRACT

A device for controlling an engine clutch in an environmentally-friendly vehicle, wherein the engine clutch is disposed between an engine and a driving motor and is configured to selectively connect the engine to the driving motor, includes: a transmission configured to receive a driving force that is transmitted from at least one of the engine and the driving motor by release or engagement of the engine clutch; and a controller configured to control the engine clutch based on a gear of the transmission when the failure of the engine clutch is detected and configured to charge a battery using the engine.

18 Claims, 4 Drawing Sheets

(51) Int. Cl.
    *B60W 10/06*    (2006.01)
    *B60W 10/08*    (2006.01)
    *B60W 10/11*    (2012.01)
    *B60W 10/26*    (2006.01)
    *B60W 50/14*    (2012.01)

(52) U.S. Cl.
    CPC . *B60W 2510/188* (2013.01); *B60W 2510/244* (2013.01); *B60W 2710/021* (2013.01); *B60W 2710/1005* (2013.01); *B60W 2710/244* (2013.01); *Y02T 10/6286* (2013.01); *Y02T 90/14* (2013.01); *Y10S 903/93* (2013.01); *Y10S 903/945* (2013.01); *Y10S 903/946* (2013.01)

(56) References Cited

U.S. PATENT DOCUMENTS

| | | | |
|---|---|---|---|
| 2014/0163791 A1* | 6/2014 | Kim | B60W 10/02 701/22 |
| 2014/0371960 A1* | 12/2014 | Lee | F04B 49/06 701/22 |
| 2015/0120104 A1* | 4/2015 | Stefanon | B60W 10/06 701/22 |

FOREIGN PATENT DOCUMENTS

| | | |
|---|---|---|
| KR | 10-1405206 B1 | 6/2014 |
| KR | 10-2015-0078365 A | 7/2015 |

* cited by examiner

DEVICE AND METHOD FOR CONTROLLING AN ENGINE CLUTCH IN AN ENVIRONMENTALLY-FRIENDLY VEHICLE

CROSS-REFERENCE TO RELATED APPLICATION

This application claims priority to and the benefit of Korean Patent Application No. 10-2016-0137782 filed in the Korean Intellectual Property Office on Oct. 21, 2016, the entire contents of which are incorporated herein by reference.

BACKGROUND

(a) Technical Field

The present disclosure relates to an engine clutch controlling apparatus for an environmentally-friendly vehicle, and more particularly, to a device and a method for controlling an engine clutch in an environmentally-friendly vehicle that is capable of controlling driving or charging of the vehicle when a failure of the engine clutch is detected.

(b) Description of the Related Art

At present, the problem of environmental pollution is becoming more serious, and use of pollution-free energy is becoming increasingly important. In particular, air pollution in large cities, which is caused in part by exhaust gas from fossil-fuel burning vehicles, has become increasingly serious.

To solve the problem caused by exhaust gas emissions and to improve fuel efficiency, environmentally-friendly vehicles have been developed.

The environmentally-friendly vehicle is one that reduces or eliminates exhaust gas emissions. Environmentally-friendly vehicles includes hybrid electric vehicles ("HEV") that drive using a combination of motor power and engine power, and plug-in hybrid electric vehicles ("PHEV") that can be equipped with a high capacity and high voltage battery that is charged using external electricity sources.

The environmentally-friendly vehicle is equipped with an engine clutch between an engine and a drive motor in order to transmit the power of the engine to a drive shaft.

The environmentally-friendly vehicle has an electric vehicle ("EV") mode in which the vehicle is driven only using the torque of the drive motor depending on whether the engine clutch is engaged, and an HEV (HEV) mode in which the vehicle is driven by both the engine torque and the drive motor torque.

It is possible to drive the environmentally-friendly vehicle by accurately determining whether the clutch is engaged. However, when the engine clutch fails, the operating state cannot be accurately determined, and thus there is an increased possibility of a problem arising during driving of the vehicle.

In addition, when the engine clutch fails resulting in the vehicle being controlled by a speed difference between the engine and the drive motor, a control time delay occurs and a the vehicle may experience a sudden, unintended acceleration.

The information disclosed in this section is merely for enhancement of understanding of the background of the invention and therefore it may contain information that does not form the prior art that is already known in this country to a person of ordinary skill in the art.

SUMMARY OF THE DISCLOSURE

The present disclosure addresses the problems identified above by providing a device and a method for controlling an engine clutch in an environmentally-friendly vehicle that are capable of driving the vehicle using an engine and a driving motor when an engine clutch failure of the is detected.

The present disclosure further provides a device and a method for controlling the engine clutch in an environmentally-friendly vehicle that are capable of charging a battery when an engine clutch failure is detected.

An example embodiment of a device for controlling the engine clutch in the environmentally-friendly vehicle according to the present disclosure includes: an engine clutch disposed between an engine and a driving motor and configured to selectively connect the engine to the driving motor; a transmission configured to receive a driving force transmitted from at least one of the engine and the driving motor by release or engagement of the engine clutch; and a controller configured to control the engine clutch based on a gear of the transmission when a failure of the engine clutch is detected and to charge a battery using the engine.

When the controller detects an engine clutch failure, the controller may (i) change a current gear of the transmission to a neutral gear, (ii) engage the engine clutch, (iii) drive the engine, (iv) charge the battery using the engine and the driving motor, and (v) change the neutral gear to the current gear.

The controller may control the engine and the driving motor to drive the vehicle when the current gear is a drive gear. The controller may control the engine and the driving motor so that the vehicle moves backward when the current gear is a reverse gear.

In an alternative method, when the controller detects an engine clutch failure, the controller: (i) releases the engine clutch, (ii) may determine whether the gear of the transmission is changed to a stop shift, (iii) may engage the engine clutch when the gear of the transmission is changed to the stop shift, and (iv) may charge the battery using the engine and the driving motor.

This example embodiment of a device for controlling the engine clutch may further include: an output unit configured to output notifications, which may include a request that requires a change to the stop shift.

When the gear of the transmission is not changed to the stop shift, the controller may check a temperature of the engine clutch with the engine clutch released and determine whether the battery is charged based on the temperature of the engine clutch.

The controller may charge the battery using the engine when the engine clutch temperature is equal to or less than a threshold temperature.

The controller may determine whether a state of charge ("SOC") of the battery is equal to or greater than a threshold value and stop charging of the battery when the battery SOC is equal to or greater than the threshold value. The controller may charge the battery using a starter-generator connected to the engine and the driving motor.

An example embodiment according to the present disclosure provides a method for controlling the engine clutch in an environmentally-friendly vehicle, including: detecting an engine clutch failure; changing a current gear of a transmission to a set gear when the engine clutch failure is detected; engaging the engine clutch to charge a battery using an engine and a driving motor; and changing the set gear to the current gear to control the engine and the driving motor based on the current gear.

Another example embodiment according to the present disclosure provides a method for controlling the engine clutch in an environmentally-friendly vehicle, including: detecting an engine clutch failure; releasing the engine clutch when the engine clutch failure; determining whether a gear of a transmission is changed to a stop gear; engaging the engine clutch when the gear of the transmission is changed to the stop gear; and charging a battery using an engine and a driving motor.

The device and the methods for controlling the engine clutch in the environmentally-friendly vehicle according to the example embodiments may drive the vehicle using the engine and the driving motor when an engine clutch is detected by controlling the engine clutch, thereby preventing sudden unintended acceleration of the vehicle.

In addition, because the battery may be charged when an engine clutch failure is detected, the example embodiments according to the present disclosure may prevent discharging of the battery.

The desired effects are not limited to the aforementioned effects. In other words, effects not described above will be apparent to those skilled in the art from the disclosure of the present invention.

DETAILED DESCRIPTION OF THE EMBODIMENTS

Hereinafter, of a device and a method for controlling an engine clutch in an environmentally-friendly vehicle is described in detail with reference to the description and the accompanying drawings. However, the drawings and the detailed description relate to specific example embodiments in order to effectively describe features of the present invention. The present invention, however, is not limited only to the drawings and description.

Furthermore, in describing example embodiments according to the present disclosure, related well-known functions or constructions will not be described in detail as they may unnecessarily obscure the understanding of the present invention. The following terminologies are defined in consideration of the functions in the present invention and may be construed in different ways by the intention of users and operators, practice, or the like. Therefore, the definitions thereof should be construed based on the contents throughout the specification.

To effectively describe core technical features of the present invention, terms may be appropriately changed, integrated, or separated for those skilled in the art in a technical field to which the present invention belongs to explicitly understand the present invention, but the present invention is not limited thereto.

Figure 1:
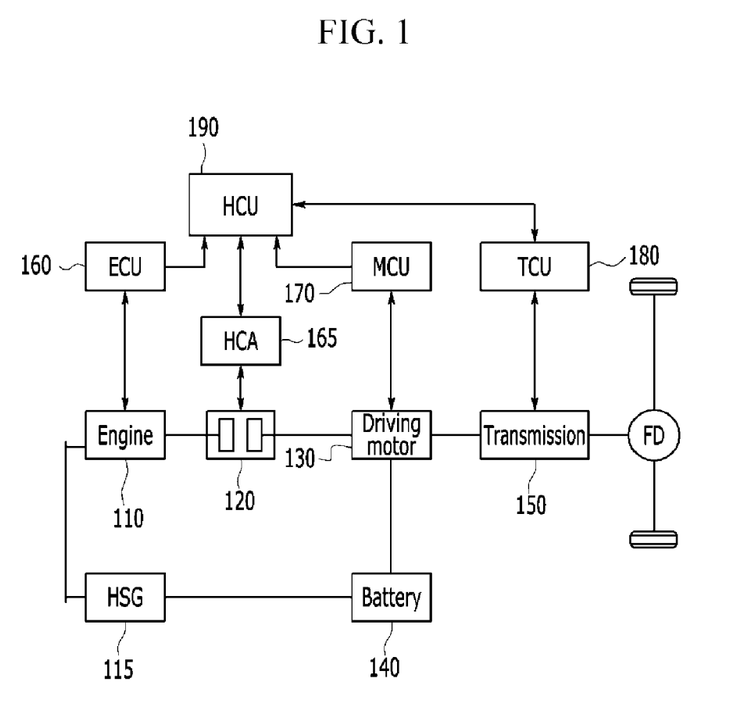
FIG. 1 is a view showing an environmentally-friendly vehicle having an example embodiment of a device for controlling an engine clutch according to the present disclosure.
Figure 2:
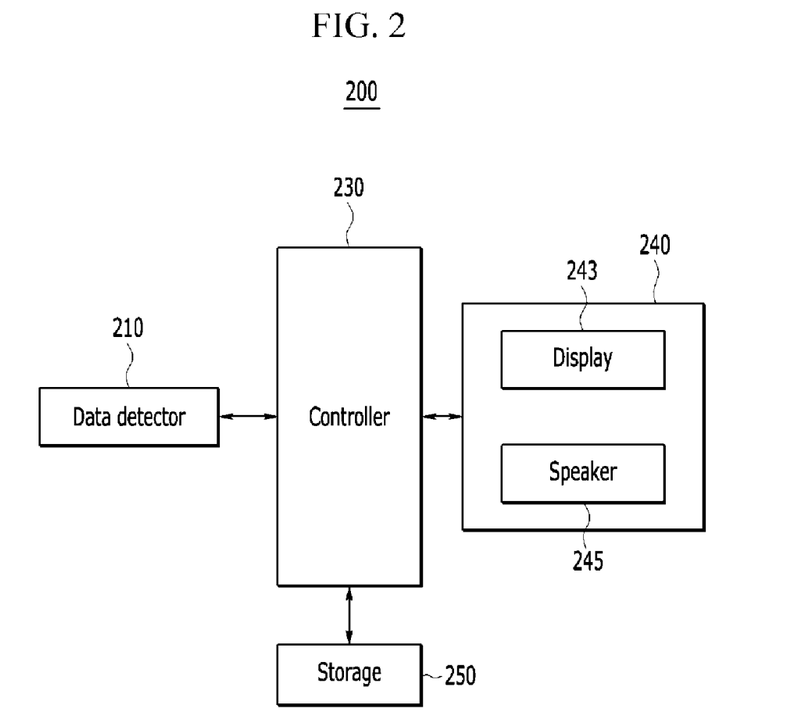
FIG. 2 is a simplified view of an example embodiment of a device for controlling the engine clutch in an environmentally-friendly vehicle according to the present disclosure.

FIG. 1 is a view showing an environmentally-friendly vehicle having a an example embodiment of a device for controlling an engine clutch in the environmentally-friendly vehicle according to. FIG. 2 is a simplified view of an example embodiment of the device for controlling the engine clutch according to the present disclosure.

A hybrid vehicle (or a hybrid electric vehicle) of FIG. 1 is shown as an example embodiment for convenience of explanation. The example embodiment may be applied not only to the hybrid vehicle of FIG. 1 but also to all other environmentally-friendly vehicles.

Referring to FIG. 1 and FIG. 2, the environmentally-friendly vehicle includes an engine 110, a hybrid starter-generator ("HSG") 115, an engine clutch 120, a driving motor 130, a battery 140, a transmission 150, an engine controller (or an engine control unit ("ECU")) 160, a hydraulic clutch actuator ("HCA") 165, a motor controller (or a motor control unit ("MCU")) 170, a transmission controller (or a transmission control unit ("TCU")) 180, and a hybrid controller (or a hybrid control unit ("HCU")) 190.

A data detector 210 may detect a state of the vehicle for controlling the motor 130, which may include vehicle speed, gear stage, displacement of an accelerator pedal, displacement of a brake pedal, rotation speed of the driving motor 130, oil temperature of the transmission 150, or torque of the driving motor in driving of the vehicle, among others. Data detector 210 may provide the detected state data to HCU 190.

Engine 160 may control engine power based on a signal received from ECU 160, and driving of engine 110 may be controlled to an optimum operating point based on a signal received from ECU 160.

HSG 115 may start engine 110 or may be operated as a generator when engine 110 is started to charge the battery 140.

Engine clutch 120 may be disposed between engine 110 and driving motor 130 and may be operated based on a signal received from HCU 190 to connect or intercept power between engine 110 and driving motor 130. In other words, engine clutch 120 may connect or disconnect the power between engine 110 and driving motor 130 based on switching between EV mode and HEV mode.

When engine clutch 120 is opened, the hybrid vehicle may be driven only by driving motor 130. When the engine clutch 120 is engaged, the hybrid vehicle may be driven only by engine 110 or by the engine and driving motor 130.

Driving motor 130 may be operated by a three-phase AC voltage applied from MCU 170 to generate torque. Driving motor 130 may act as a generator when the vehicle is coasting or during regenerative braking to supply a voltage to battery 140.

Battery 140 may include a plurality of unit cells, and may store a high voltage for providing a driving voltage to driving motor 130. Battery 140 may supply the driving voltage to driving motor 130 in either the EV mode or the HEV mode and may be charged by a voltage generated by driving motor 130 and engine 110 during the regenerative braking.

According to another embodiment of the present invention, battery 140 may be charged by a voltage and a current supplied via a charging device when the vehicle is connected to a commercial power source.

Transmission 150 may adjust a shift ratio based on a control signal from TCU 180. Transmission 150 also may adjust an output torque applied through engine clutch 120 based on a vehicle operation mode using the shift ratio to deliver the adjusted output torque to a drive wheel so that the hybrid vehicle is driven.

ECU 160 may be connected to HCU 190 via a network, and may operate in conjunction with HCU 190 to control operation of engine 110 based on one or more of a variety of signals relating to the engine operation state. For example, the engine operation state signal may indicate torque requested by a driver, a coolant temperature, a number of rotations of the engine, an amount of that a throttle valve is opened, an amount of intake air, an amount of oxygen entering the engine, or the engine torque. ECU 160 may provide an operating state of engine 110 to HCU 190.

HCA 165 may control engagement and disengagement (or release) of the engine clutch 120 based on a signal received from HCU 190.

MCU 170 may control driving and torque of driving motor 130 based on a signal received from HCU 190 and may store a voltage generated by driving motor 130 during regenerative braking in battery 140.

TCU 180 may control overall operation of transmission 150 by controlling the shift ratio based on output torques received from ECU 160 and MCU 170 and by determining the regenerative braking amount. TCU 180 may provide an operating state of transmission 150 to HCU 190.

HCU 190 may be the highest-level controller that sets the operation mode and controls overall operation of the environmentally-friendly vehicle. HCU 190 may integrally control the other lower-level controllers connected to HCU 190 via the network, may collect and analyze information received from each lower-level controller, and may cooperate with the other lower-level controllers to control output torques of engine 110 and driving motor 130.

Conventional operation of an environmentally-friendly vehicle having the above described functions is well-known, and thus a detailed description thereof will be omitted.

FIG. 2 is a simplified view of an example embodiment of a device for controlling the engine clutch according to the present disclosure.

In some methods of operation, which will be described below, certain controls may be performed by HCA 165 and TCU 180, and other controls may be executed by HCU 190. Therefore, it is possible to describe ECU 160, HCA 165, MCU 170, TCU 180, and HCU 190 collectively as a single controller 230. For convenience of description, ECU 160, HCA 165, MCU 170, TCU 180, and HCU 190 will be collectively referred to as controller 230 unless otherwise specified.

Referring to FIG. 2, device 200 for controlling the engine clutch includes a data detector 210, controller 230, an output unit (or an output device) 240, and a storage unit (or a storage device) 250.

Data detector 210 may detect state data of the vehicle for controlling engine clutch 120, which may include the vehicle speed, a gear gear, the displacement of the accelerator pedal, the displacement of the brake pedal, the rotation speed of driving motor 130, the oil temperature of transmission 150, and/or torque of the driving motor while driving the vehicle. Data detector 210 may provide the detected state data to controller 230.

Controller 230 may control the vehicle when engine clutch 120 fails. In more detail, when controller 230 detects a failure of engine clutch 120, controller 230 may change a current gear engaged in transmission 150 to a neutral gear, engage engine clutch 120, charge battery 140 using engine 110 and driving motor 130, and change the neutral gear back to the current gear to drive the vehicle.

Alternatively, when controller 230 detects an engine clutch failure, controller 230 may release engine clutch 120, engage engine clutch 120 when a current gear engaged in the transmission 150 is changed to a stop gear, and charge battery 140 using engine 110 and driving motor 130.

Controller 230 may determine whether battery 140 is charged based on a temperature of engine clutch 120 when the gear engaged in transmission 150 is not changed to the stop gear (i.e. the gear that is engaged when the vehicle stops; for example a parking gear).

In an example embodiment, controller 230 may comprise one or more processors operating according to a program designed to perform each step of the method for controlling the engine clutch. The method of controlling the engine clutch 120 will now be described in more detail with reference to FIG. 3 and FIG. 4.

Output unit 240 may provide notifications to allow the driver to change gears. The notifications may include a request that requires a change to the stop gear. In other words, the notifications may indicate that the driver should change the gear of the transmission to the stop gear, and may be set in advance. The notifications may include a voice, a graphic, a light, a character, etc.

Output unit 240 may include at least one of a display 243 and a speaker 245.

Display 243 may display the notifications based on a signal received from controller 230. For example, Display 243 may be a navigation device, an instrument cluster, an audio-video navigation system (AVN), etc. The instrument cluster may be an instrument panel, a heads up display or any other type of display informing the driver of information about the vehicle such as the vehicle speed, the engine speed, or the coolant temperature while driving of the vehicle.

Speaker 245 may output the notifications using a voice based on a signal received from controller 230.

Storage unit 250 may store data generated by or necessary for use by any element of the device for controlling an engine clutch. For example, storage unit 250 may store the state data detected by data detector 210, and may also store the notifications. Storage unit 250 may also store various programs for controlling overall operation of the device for controlling the engine clutch.

In addition, storage unit 250 may provide necessary data to controller 230 and output unit 240 in response to requests from controller 230 and output unit 240.

In an example embodiment, storage unit 250 may be an integrated memory or may be subdivided into a plurality of memories. For example, storage unit 250 may include a read-only memory (ROM), a random access memory (RAM), or a flash memory.

Hereinafter, the method of controlling the engine clutch in the environmentally-friendly vehicle is described in detail with reference to FIG. 3 and FIG. 4.

Figure 3:
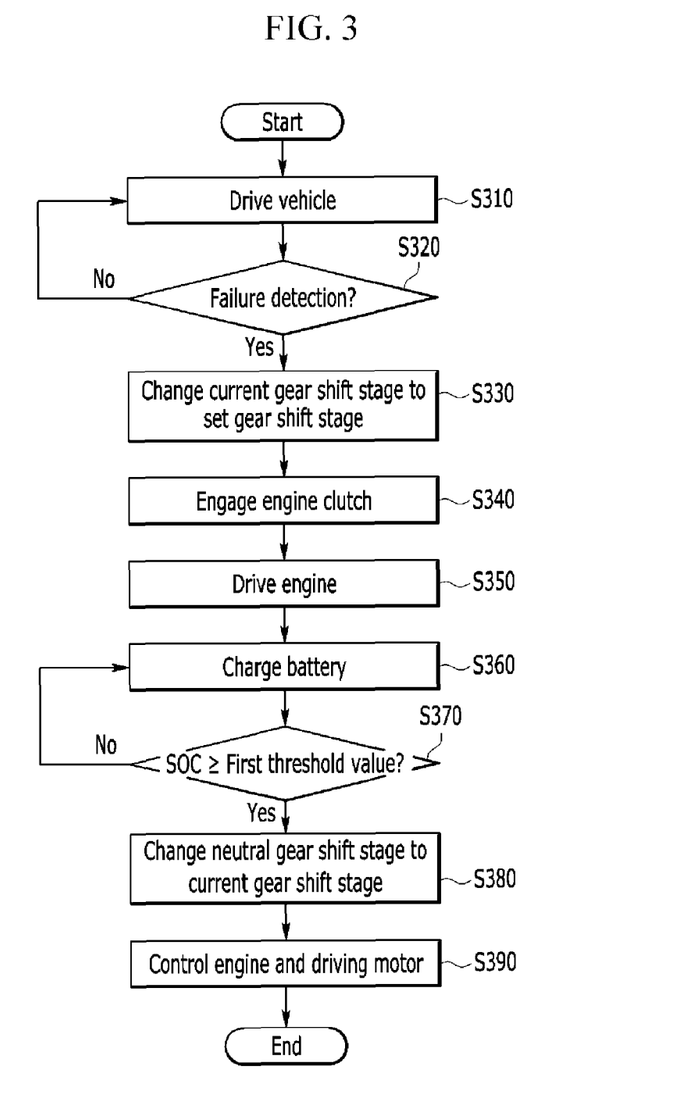
FIG. 3 is a flowchart illustrating an example embodiment of a method of controlling the engine clutch in an environmentally-friendly vehicle according to the present disclosure.

FIG. 3 is a flowchart illustrating an example embodiment of a method of controlling the engine clutch.

Referring to FIG. 3, controller 230 may drive at least one of engine 110 and driving motor 130 to drive the vehicle when the vehicle is turned on by the driver (step S310).

Controller 230 may determine whether a failure is detected in the engine clutch 120 (step S320). For example, when controller 230 determines that engine clutch 120 is released in a vehicle operation state where the engine clutch should be engaged, controller 230 may determine that engine clutch 120 has failed based on the state data. Because the method of detecting the failure of the engine clutch 120 is a known technique, a detailed description thereof will be omitted.

If the failure of engine clutch 120 is not detected, controller 230 returns to step S310 to drive the vehicle.

If controller 230 detects a failure of engine clutch 120, controller 230 may change the current gear of the transmission to a set gear (step S330). The current gear may represent the gear engaged in transmission 150, and the set gear may represent the neutral gear. In more detail, when controller 230 detects the failure of engine clutch 120, controller 230 may change the current gear of transmission 150 to neutral gear to forcibly block the power.

Controller 230 may then forcibly engage engine clutch 120 (step S340).

Controller 230 may then drive the engine 110 (step S350) to drive the vehicle.

Controller 230 may then charge battery 140 (step S360) using HSG 115 connected to engine 110 and driving motor 130 when the engine clutch 120 is engaged.

Controller 230 may determine whether a state of charge ("SOC") of battery 140 is equal to or greater than a first threshold value (step S370). Herein, the first threshold value may be a reference value for determining when charging of the battery 140 should end, and may be set using a predetermined algorithm (for example, a program or a probability model).

When the battery SOC is less than the first threshold value, controller 230 may return to step S360 to charge battery 140.

When the battery SOC is equal to or greater than the first threshold value, controller 230 may then change the neutral gear back to the current gear (step S380). For example, if the current gear is a driving gear, controller 230 may change the neutral gear to the drive gear when the battery SOC is equal to or greater than the first threshold value. In contrast, If the current gear is a reverse gear, controller 230 may change the neutral gear to the reverse gear when the battery is equal to or greater than the first threshold value.

Controller 230 may then control engine 110 and driving motor 130 (step S390). For example, when the gear engaged in transmission 150 is a drive gear, controller 230 may control the engine and the driving motor 130 to drive the vehicle; and when the gear engaged in transmission 150 is the reverse gear, controller 230 may control the engine and the drive motor 130 so that the vehicle moves backward.

Figure 4:
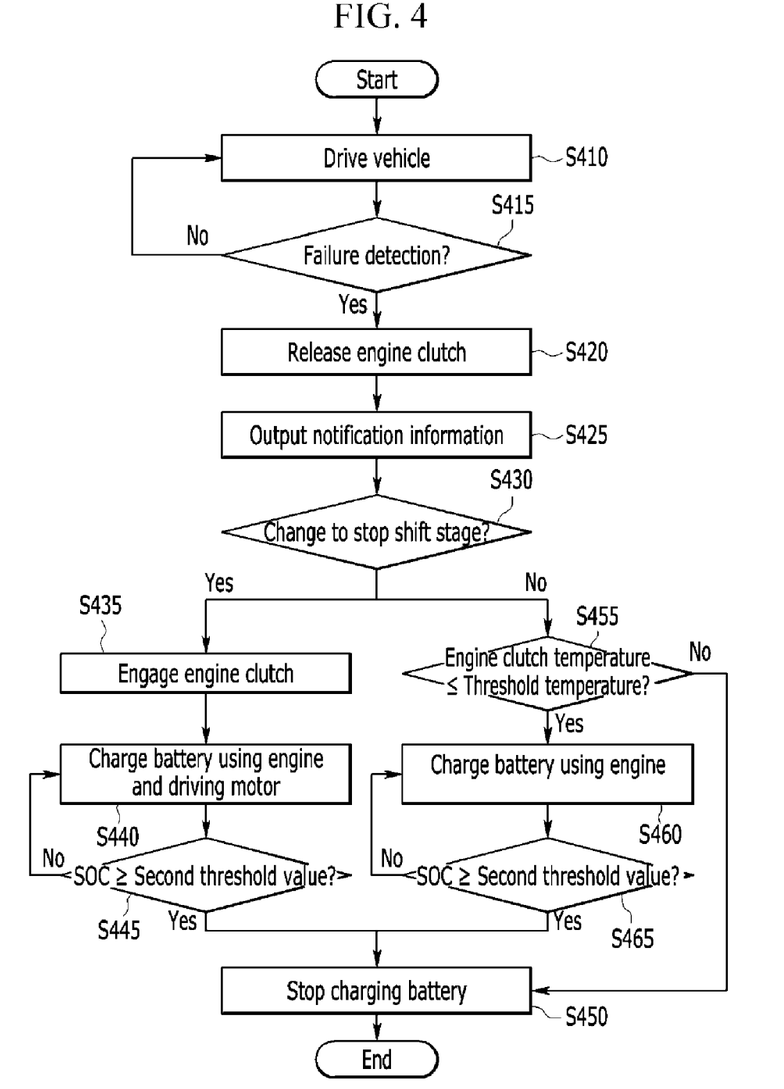
FIG. 4 is a flowchart illustrating another example embodiment of a method of controlling the engine clutch in an environmentally-friendly vehicle.

FIG. 4 is a flowchart illustrating another example embodiment of a method of controlling the engine clutch.

Referring to FIG. 4, controller 230 may drive at least one of engine 110 and driving motor 130 to drive the vehicle when a driver turns on the vehicle (step S410).

Controller 230 may then determine whether a failure is detected in engine clutch 120 (step S415).

Controller 230 may then release engine clutch 120 when a failure is detected (step S420).

Controller 230 causes output unit 240 to output the notifications (step S425). In more detail, based on a signal received from controller 230, the output unit 240 may output the notifications to indicate that the driver should change the gear of the transmission to the stop gear.

Controller 230 may then determine whether the gear of transmission 150 is changed to the stop gear (step S430).

Controller 230 may forcibly engage engine clutch 120 when the gear is changed to the stop gear (step S435), because the engine clutch 120 is in an abnormal state.

Controller 230 may then charge battery 140 using engine 110 and driving motor 130 (step S440) using HSG 115 connected to engine 110 and drive motor 130 when engine clutch 120 is engaged. In other words, HSG 115 and driving motor 130 may act as generators supplying a voltage to battery 140 to charge battery 140.

Controller 230 may then determine whether the battery SOC is equal to or greater than a second threshold value (step S445). The second threshold value may be a reference value for determining when charging of battery 140 should end, and may be set using a predetermined algorithm (e.g., a program or a probability model). The second threshold value may be different from the first threshold value described in FIG. 3.

Controller 230 may then stop charging of the battery 140 when the battery SOC is equal to or greater than the second threshold value (step S450).

If the gear of the transmission if not changed to a stop gear, controller 230 may determine whether a temperature of engine clutch 120 is equal to or less than a threshold temperature (step S455). The threshold temperature may be a reference temperature for determining when charging of battery 140 should occur, and may be set using a predetermined algorithm (e.g., a program or a probability model).

Controller 230 may next stop charging battery 140 when the temperature of engine clutch 120 exceeds the threshold temperature.

When the temperature of the engine clutch 120 is equal to or less than the threshold temperature, controller 230 may charge battery 140 (step S460) using HSG 115 connected to engine 110.

Controller 230 may then determine whether the battery SOC is equal to or greater than the second threshold value (step S465).

When the battery SOC is less than the second threshold value, controller 230 may return to step S460 to charge e battery 140 using engine 110.

Controller 230 may stop charging battery 140 when the battery SOC is equal to or greater than the second threshold value.

While this invention has been described in connection with practical example embodiments, it is to be understood that the invention is not limited to the disclosed embodiments, but, on the contrary, is intended to cover various modifications and equivalent arrangements included within the spirit and scope of the appended claims.

DESCRIPTION OF SYMBOLS

110: engine
115: HSG
130: motor
140: battery
150: transmission
160: ECU
165: HCA
170: MCU
180: TCU
190: HCU
210: data detector
230: controller
240: output unit

What is claimed is:

1. A device for controlling an engine clutch, comprising:
a transmission configured to receive a driving force that is transmitted from at least one of an engine and a driving motor by release or engagement of the engine clutch; and
a controller configured to control the engine clutch based on a current gear of the transmission when an engine clutch failure is detected, wherein the engine clutch failure comprises the engine clutch being released in a vehicle operation state where the engine clutch should be engaged or the engine clutch being engaged in a vehicle operation state where the engine clutch should be released, based on state data of a vehicle for controlling the engine clutch, and to control charging of a vehicle battery using the engine;
wherein when the controller detects the engine clutch failure, the controller:
changes the current gear of the transmission to a neutral gear,
engages the engine clutch,
drives the engine,
charges the battery using the engine and the driving motor, and
changes the neutral gear back to the current gear.

2. The device for controlling the engine clutch of claim 1, wherein the controller controls the engine and the driving motor to drive the vehicle when the current gear is a drive gear.

3. The device for controlling the engine clutch of claim 1, wherein the controller controls the engine and the driving motor so that the vehicle moves backward when the current gear is a reverse gear.

4. A device for controlling an engine clutch comprising:
a transmission configured to receive a driving force that is transmitted from at least one of an engine and a driving motor by release or engagement of the engine clutch; and
a controller configured to control the engine clutch based on a current gear of the transmission when an engine clutch failure is detected, wherein the engine clutch failure comprises the engine clutch being released in a vehicle operation state where the engine clutch should be engaged or the engine clutch being engaged in a vehicle operation state where the engine clutch should be released, based on state data of a vehicle for controlling the engine clutch, and the controller being further configured to control charging of a vehicle battery using the engine,
wherein when the controller detects the engine clutch failure, the controller:
releases the engine clutch,
determines whether the current gear of the transmission is changed to a stop gear,
engages the engine clutch when the current gear of the transmission is changed to the stop gear, and
charges the battery using the engine and the driving motor.

5. The device for controlling the engine clutch of claim 4, further comprising an output unit configured to output notifications to the vehicle driver.

6. The device for controlling the engine clutch of claim 4, wherein when the current gear of the transmission is not changed to the stop gear, the controller checks a temperature of the engine clutch when the engine clutch is released and determines whether the battery is charged based on the temperature of the engine clutch.

7. The device for controlling the engine clutch of claim 6, wherein the controller charges the battery using the engine when the temperature of the engine clutch is equal to or less than a threshold temperature.

8. The device for controlling the engine clutch of claim 1, wherein the controller determines a battery state of charge and stops charging the battery if the battery state of charge is equal to or greater than a threshold value.

9. The device for controlling the engine clutch of claim 1, wherein the controller charges the battery using a starter-generator connected to the engine and the driving motor.

10. A method for controlling an engine clutch, comprising:
detecting a failure of the engine clutch, wherein the engine clutch failure comprises the engine clutch being released in a vehicle operation state where the engine clutch should be engaged or the engine clutch being engaged in a vehicle operation state where the engine clutch should be released, based on state data of a vehicle for controlling the engine clutch;
changing a current gear of a transmission to a set gear when the failure of the engine clutch is detected;
engaging the engine clutch to charge a battery using an engine and a driving motor; and
changing the set gear to the current gear to control the engine and the driving motor based on the current gear.

11. The method for controlling the engine clutch of claim 10, wherein the step of changing the current gear to the set gear comprises changing the current gear to a neutral gear.

12. The method for controlling the engine clutch of claim 10, wherein the current gear comprises a driving gear or a reverse gear.

13. The method for controlling the engine clutch of claim 10, further comprising:
determining a battery state of charge after the step of charging the battery using the engine and the driving motor; and
stopping battery charging when the battery SOC is greater than or equal to a threshold value.

14. A method for controlling an engine clutch, comprising:
detecting a failure of the engine clutch, wherein the engine clutch failure comprises the engine clutch being released in a vehicle operation state where the engine clutch should be engaged or the engine clutch being engaged in a vehicle operation state where the engine clutch should be released, based on state data of a vehicle for controlling the engine clutch;
releasing the engine clutch when the failure of the engine clutch is detected;
determining whether a gear of a transmission is changed to a stop gear;
engaging the engine clutch when the gear of the transmission is changed to the stop gear; and
charging a battery using an engine and a driving motor.

15. The method for controlling the engine clutch of claim 14, further comprising:
determining a battery state of charge after the step of charging the battery; and
stopping battery charging y when the battery state of charge is greater than or equal to a threshold value.

16. The method for controlling the engine clutch of claim 14, further comprising:
after the step of determining whether the gear of the transmission is changed to the stop gear, maintaining the engine clutch in a released state when the gear is not changed to the stop gear;

checking a temperature of the engine clutch; and
controlling battery charging based on the temperature of the engine clutch.

17. The method for controlling the engine clutch of claim 16, wherein the step of controlling charging of the battery based on the temperature of the engine clutch comprises:
determining whether the temperature of the engine clutch is less than or equal to a threshold temperature; and
charging the battery using the engine when the temperature of the engine clutch is less than or equal to the threshold temperature.

18. The method for controlling the engine clutch of claim 14, further comprising:
outputting notifications to a driver.

\* \* \* \* \*